Jan. 25, 1955  G. H. JOHNSON  2,700,243
MINNOW BUCKET
Filed April 29, 1954
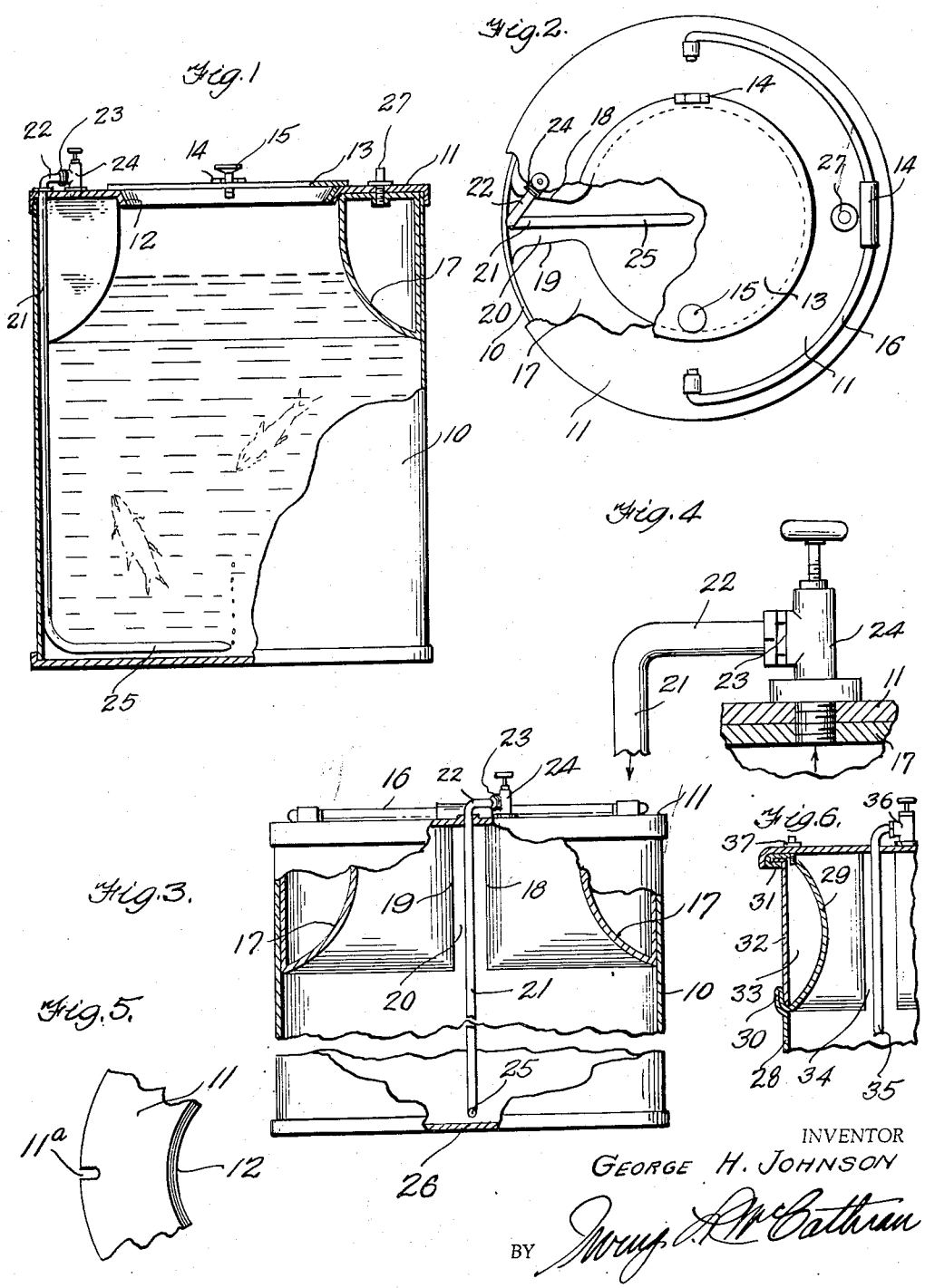
INVENTOR
GEORGE H. JOHNSON
BY
HIS ATTORNEY

United States Patent Office 2,700,243
Patented Jan. 25, 1955

2,700,243
MINNOW BUCKET

George H. Johnson, Dallas, Tex.

Application April 29, 1954, Serial No. 426,501

4 Claims. (Cl. 43—56)

This invention relates to a minnow bucket, and has for one of its objects the production of a simple and efficient minnow bucket which is so constructed as to facilitate the removal of the air inlet duct or tube from the bucket in the event of the necessity for repair to the tube.

A further object of this invention is the production of a simple and efficient air chamber which does not encircle the entire inner circumference of the minnow bucket, thereby providing a space between the ends of the air chamber, between which ends the air inlet duct or tube extends to the bottom of the bucket.

Other objects and advantages of the present invention will appear throughout the following specification and claims.

In the drawing:

Figure 1 is a vertical sectional view of the minnow bucket, a portion thereof being shown in elevation;

Figure 2 is a top plan view of the minnow bucket, a portion of the top thereof being broken away;

Figure 3 is a fragmentary vertical sectional view of the minnow bucket, a portion thereof being shown in elevation;

Figure 4 is an enlarged side elevational view of the air regulator valve which carries the air inlet duct or tube;

Figure 5 is a fragmentary top plan view of the top of the bucket;

Figure 6 is a fragmentary vertical sectional view illustrating a modified form of the invention.

By referring to the drawing in detail, it will be seen that 10 designates the minnow bucket defining a hollow body, which is provided with a top 11. The top 11 is provided with a central aperture 12 to facilitate access into the interior of the body. The aperture 12 is normally closed by means of a lid 13. The lid 13 is preferably hinged as at 14, and is provided with a suitable releasable latch 15 to hold the lid in a closed position. A conventional bail 16 is secured to the top 11.

An air chamber 17 is secured within the bucket 10 to the inner face thereof, and near the top of the bucket 10, as shown in Figures 1 and 3. This chamber 17 does not completely encircle the inner face of the bucket but terminates in two slightly spaced end portions 18 and 19, as shown in Figures 2 and 3, thereby defining a space 20 between the end portions. This space 20 provides an area through which the air outlet duct or tube 21 extends vertically of the bucket 10.

The duct or tube 21 is detachably connected at its upper end 22 to the packing nipple 23 of the air outlet regulator valve 24 of a conventional type, such as is commonly used in aerated minnow buckets. The valve 24 is provided with threaded engagement with the top of the chamber 17 near the end portion 18, and communicates with the interior of said chamber to convey air therefrom to the duct or tube 21. The upper end 22 of the duct or tube 21 angularly extends from the valve 24 to a point intermediate the end portions 18 and 19 of the chamber 17. The duct or tube 21 passes through the notch 11ª of the top 11 and down into the bucket 10 between the end portions 18 and 19 to the bottom of the bucket 10, and fits close to the inner face of the bucket 10, as shown. The duct or tube 21 is provided with an elongated nozzle portion 25 at its lower end, and is preferably provided with a single air discharge aperture 26 at the terminal thereof, near the center of the bucket and preferably close to the bottom thereof.

An automatically closing air intake 27 of a conventional type similar to a tire valve is carried by the chamber 17 to facilitate filling the chamber 17 with air when desired. The air regulator valve 24 is adjusted to pass air into and through the duct or tube 21 from the chamber 17, and into the bottom of the bucket 10 to aerate the water within the bucket.

When necessary or when desired, the duct or tube 21 may be lifted out of the bucket and may also be detached from the nipple 23 for the purpose of repair, replacement or cleaning. This is due to the fact that the duct or tube 21 extends down through the space 20 between ends 18 and 19 of the chamber 17, and is not otherwise fixed directly to the bucket 10. Furthermore, the duct or tube 21 fits snugly against the inner face of the bucket 10, and is not likely to become injured due to its shielded location between the ends 18 and 19 of the chamber 17, and its engagement with the inner face of the bucket 10.

In Figure 6, there is shown a modified form of the bucket, wherein 28 designates the hollow body of the bucket which is pressed inwardly to define an air chamber 29. Clincher ribs 30 and 31 are formed in the wall of the body to receive a closure plate 32 to define an air compartment 33. The chamber 29 is otherwise constructed as defined in the previously described structure to provide a duct receiving space or area 34 through which the duct 35 extends down into the body to aerate the water therein. The duct 35 is connected to the air regulator valve 36. An air intake 37 communicates with the air chamber 29.

It should be understood that certain detail changes in the mechanical structure and arrangement of parts may be employed without departing from the spirit of the invention, so long as such changes fall within the scope of the appended claims.

Having described the invention, what I claim as new is:

1. A minnow bucket of the class described comprising a hollow body, an air chamber within the hollow body, an air intake valve and an air outlet regulator valve attached in operative relationship to said air chamber, and an air outlet duct secured to said outlet regulator valve, said duct extending to the bottom of said chamber, and said air chamber having spaced end portions defining a space, said duct having a portion thereof in said space whereby the removal, repair, cleaning and replacement of said duct is facilitated.

2. A minnow bucket as defined in claim 1, wherein said outlet duct extends vertically in close proximity to the inner face of said hollow body to protect and shield said duct from injury.

3. A minnow bucket as defined in claim 1, wherein said outlet duct has an angularly extending end which is detachably secured to said outlet regulator valve, the outlet regulator valve being carried by the top of said chamber near one of said spaced end portions.

4. A minnow bucket as defined in claim 1, wherein said air chamber is formed as a part of the wall of the hollow body and includes a closure plate upon the wall.

References Cited in the file of this patent
UNITED STATES PATENTS

| | | |
|---|---|---|
| 445,131 | Adams et al. | Jan. 20, 1891 |
| 1,568,730 | Gleason | Jan. 5, 1926 |
| 1,616,125 | Holman | Feb. 1, 1927 |
| 1,899,308 | Brown | Feb. 28, 1933 |